(12) United States Patent
Maninder et al.

(10) Patent No.: US 10,454,913 B2
(45) Date of Patent: Oct. 22, 2019

(54) DEVICE AUTHENTICATION AGENT

(71) Applicant: Hewlett Packard Enterprise Development LP, Houston, TX (US)

(72) Inventors: Raniyal Maninder, Bangalore (IN); Madhyastha Sandesh V, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 232 days.

(21) Appl. No.: 15/320,109

(22) PCT Filed: Mar. 3, 2015

(86) PCT No.: PCT/US2015/018483
§ 371 (c)(1),
(2) Date: Dec. 19, 2016

(87) PCT Pub. No.: WO2016/014120
PCT Pub. Date: Jan. 28, 2016

(65) Prior Publication Data
US 2017/0142087 A1    May 18, 2017

(30) Foreign Application Priority Data
Jul. 24, 2014    (IN) .......................... 3628/CHE/2014

(51) Int. Cl.
*H04L 29/06*    (2006.01)
*H04L 9/32*    (2006.01)
(Continued)

(52) U.S. Cl.
CPC .............. *H04L 63/08* (2013.01); *G06F 21/31* (2013.01); *G06F 21/44* (2013.01); *H04L 9/0866* (2013.01);
(Continued)

(58) Field of Classification Search
CPC ..... H04L 63/08; H04L 63/10; H04L 63/0861; H04L 63/0876; G06F 21/31; G06F 21/44
See application file for complete search history.

(56) References Cited

U.S. PATENT DOCUMENTS 8,090,945 B2    1/2012  Singhal
8,151,322 B2    4/2012  Chen et al.
(Continued)

OTHER PUBLICATIONS

Faruk Bagci et al., Communication and Security Extensions for a Ubiquitous Mobile Agent System (UbiMAS), May 4-6, 2005, ACM, pp. 246-251.*
(Continued)

*Primary Examiner* — Luu T Pham
*Assistant Examiner* — Fahimeh Mohammadi
(74) *Attorney, Agent, or Firm* — Hewlett Packard Enterprise Patent Department

(57) ABSTRACT

Techniques for user authentication are provided. In one aspect, an authentication request form a user device may be received. The authentication request may include a username. A time stamp may be sent to the user device. An encrypted response may be received form the user device. The response may have been encrypted with a user and device specific authentication agent. The encrypted response may be based on the time stamp. The authentication agent may include user and device specific parameters.

7 Claims, 8 Drawing Sheets

(51) Int. Cl.
*H04L 9/08* (2006.01)
*G06F 21/31* (2013.01)
*G06F 21/44* (2013.01)

(52) U.S. Cl.
CPC .............. *H04L 9/32* (2013.01); *H04L 9/3297* (2013.01); *H04L 63/0428* (2013.01); *H04L 63/1408* (2013.01); *G06F 2221/2137* (2013.01); *H04L 2463/082* (2013.01); *H04L 2463/102* (2013.01)

(56) References Cited

U.S. PATENT DOCUMENTS

| | | | |
|---|---|---|---|
| 8,196,193 | B2 | 6/2012 | Hoey et al. |
| 8,769,642 | B1* | 7/2014 | O'Neill ................... H04L 63/10 726/1 |
| 2004/0128500 | A1* | 7/2004 | Cihula .................... G06F 21/34 713/155 |
| 2007/0101074 | A1* | 5/2007 | Patterson .......... G06F 17/30153 711/156 |
| 2007/0220594 | A1 | 9/2007 | Tulsyan |
| 2008/0104675 | A1* | 5/2008 | Kusano ............... H04L 63/0807 726/4 |
| 2009/0113481 | A1* | 4/2009 | Friedman ........... H04N 5/44543 725/46 |
| 2009/0187757 | A1* | 7/2009 | Kerschbaum .......... G06Q 10/10 713/153 |
| 2010/0242102 | A1 | 9/2010 | Cross et al. |
| 2011/0099612 | A1* | 4/2011 | Lee ........................ H04L 51/04 726/6 |
| 2012/0023558 | A1 | 1/2012 | Rafiq |
| 2013/0042314 | A1* | 2/2013 | Kelley ................. H04L 9/3215 726/9 |
| 2013/0198801 | A1* | 8/2013 | Nishizawa ........ H04L 29/06768 726/1 |
| 2013/0198828 | A1 | 8/2013 | Pendergrass et al. |
| 2013/0219461 | A1* | 8/2013 | Esaki ...................... H04L 63/08 726/1 |
| 2013/0247142 | A1* | 9/2013 | Nishizawa ............ G06F 21/604 726/1 |
| 2013/0333009 | A1* | 12/2013 | Mackler ................. G06F 21/31 726/7 |
| 2014/0047522 | A1* | 2/2014 | Chin ................... H04L 63/0807 726/6 |
| 2014/0101453 | A1* | 4/2014 | Senthurpandi ...... H04L 63/0861 713/172 |
| 2014/0297516 | A1* | 10/2014 | Brown ................ G06F 3/04817 705/39 |
| 2015/0113599 | A1* | 4/2015 | Curtis ................. H04L 63/0428 726/4 |

OTHER PUBLICATIONS

Vincent Lenders et al., Location-based Trust for Mobile User-generated Content: Applications, Challenges and Implementations, Feb. 25-26, 2008, ACM, pp. 60-64.*

Zang Li et al., SIP-RLTS: An RFID Location Tracking System Based on SIP, May 14, 2008, IEEE, pp. 173-182.*

Qi He et al. The Quest for Personal Control over Mobile Location Privacy, Jun. 28, 2004, IEEE, vol. 42, Issue: 5, pp. 130-136.*

International Searching Authority, The International Search Report and the Written Opinion, PCT/US2015/018483, dated May 29, 2015, 13 Pgs.

Tolkien, J.R.R., Multifactor Authentication: Its Time Has Come, (Research Paper), Aug. 2013, 8 Pages.

Tranquillin, M. et al., Using Mobile Agents for Secure Biometric Authentication, (Research Paper), Feb. 26, 2011, 4 Pages.

* cited by examiner

DEVICE AUTHENTICATION AGENT

BACKGROUND

Authentication of users of computer systems ensures that only authorized users are able to access the system. Many authentication systems are built around three authentication factors: 1) Something you know, 2) Something you have, and 3) Something you are. Something you know may relate to knowledge that an authorized user has, but should not be available to others, such as a password or personal identification number (PIN). Something you have may refer to a physical object that is in the possession of the user. For example, a SecureID token from RSA™. Something you are may refer to immutable characteristics of a user, such as biometric identification information. For example, a user's fingerprints, retinal scans, or DNA are characteristics that may define the user and are difficult, if not impossible, to alter or reproduce. Authentication systems may utilize one, two, or three of these factors in order to properly authenticate users.

DETAILED DESCRIPTION

The techniques described herein make use of all three factors in order to authenticate a user. The user may provide a password that ensures the user satisfies the "something you know" factor. The user may also provide biometric identification data, such as a fingerprint or retinal scan to satisfy the "something you are" factor. To satisfy the third factor, "something you have," the present disclosure provides for an authentication agent. An authentication agent may be a software program, which may be a set of instructions executable by a processor of a computer, which is tied to both the user and the device that the user is using to request authentication.

Because the authentication agent is tied to a particular device, use of the authentication agent during the authentication process ensures that the user has access to the device for which the authentication agent was created. The reason for this is that the authentication agent cannot be successfully used on any other device, other than the device for which it was created. Because of this characteristic, this ensures that the user attempting to be authenticated is in possession of that device (e.g. something you have). In combination with the other two factors, authentication of user may be made more secure.

Figure 1:
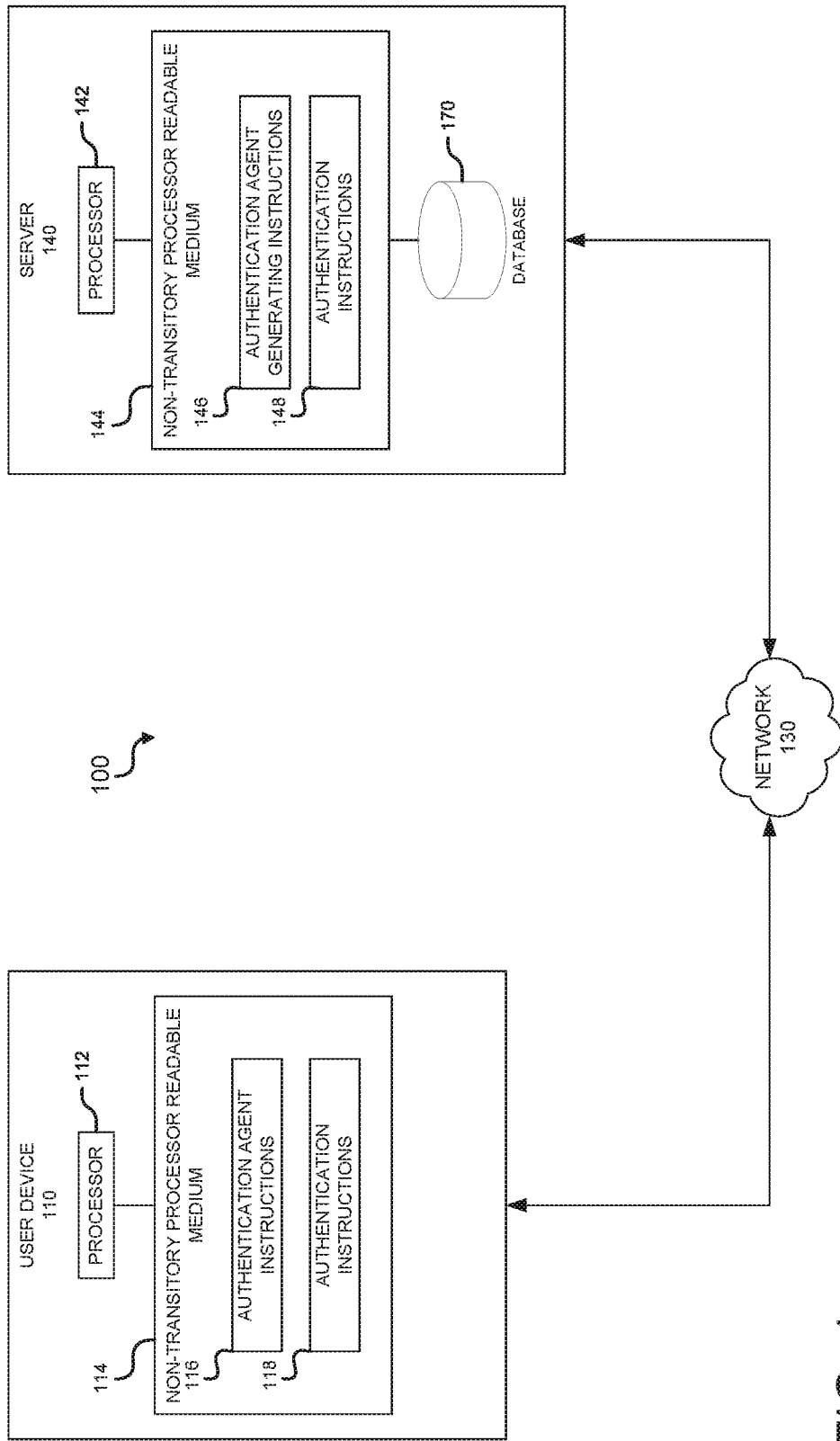
FIG. 1 is an example of a system that may utilize the device authentication agent described herein.

FIG. 1 is an example of a system that may utilize the device authentication agent described herein. System 100 may include a user device 110, a server 140, and a network 190. The network 190 may allow communication between the user device and the server. The network may be a wired or wireless network. The network may be an intranet, the Internet, or any other type of network that may allow communication between a user device and a server. The techniques described herein are not dependent on any particular form of network 190.

User device 110 may be any type of device that may be used by a user. For example, the user device may be a desktop or laptop computer, a mobile phone, a tablet, an e-book reader, or any other type of computing device. The techniques described herein are not dependent on any particular type of device. The user device may include a processor 112. Coupled to the processor may be a non-transitory processor readable medium 114. The processor readable medium may contain thereon a set of instructions, which when executed by the processor may cause the processor to implement the techniques described herein.

For example, the medium 114 may include authentication agent instructions 116 to cause the processor to implement an authentication agent that is associated with the user device 110. The medium may also include authentication instructions 118 which cause the processor to use the authentication agent instructions to authenticate a user. Operation of the authentication agent is described in further detail below.

Server 140 may include a processor 142. Coupled to the processor 142 may be a non-transitory processor readable medium 144. The processor readable medium may contain thereon a set of instructions, which when executed by the processor may cause the processor to implement the techniques described herein. For example, the medium 144 may include authentication agent generating instructions 146 to cause the processor to generate an authentication agent for the user device 110. The medium may also include authentication instructions 148 to allow the server to authenticate a user. Operation of the authentication agent generation instructions and authentication instructions is described in further detail below. The server 140 may also include a database 170. The database may store various parameters used in the authentication process, as will be described below.

In operation, a user device may request generation of an authentication agent using the authentication instructions. The request for generation of an authentication agent may include an identifier associated with the user device. For example, the identifier may be a serial number of the device or a media access control (MAC) address of the device. The particular form of the identifier is unimportant. Any identifier that may uniquely identify the device may be suitable. The request may be sent to the server. As part of the authentication agent generation request, the user using the user device may also establish a password that is known to the user and the server. The password may be established with the server over a secure channel, such as a secure sockets layer (SSL) connection over the network 190. In other cases, the password may be established by other means, such as a phone call to a call center. Regardless of implementation, what should be understood is that a password that should only be known by the user and the server is established. The techniques described herein are not dependent on how the password is established.

In addition, biometric identification information of the user may be provided to the server in a secure manner. This may be done over a secure channel, such as an SSL connection, or may involve the user physically visiting a location to provide biometric identification information to the server. The particular mechanism by which the server obtains the biometric identification information is relatively unimportant. What should be understood is that the server has access to biometric identification information for the user.

The server may then generate an authentication agent using the authentication agent instructions. The authentication agent may include a random number of tags randomly inserted within the authentication agent. These tags may be used in an encryption operation that is described below. The number and location of the tags may be stored by the server in a database. In addition, the server may take the user device identifier and generate a derived device identifier. The derivation process, such as a hash, may be a process such that given the derived value it is impractical to recover the original value. The derived identifier may also be included in the authentication agent. The generated authentication agent may then be sent to the user device.

A user of the user device may wish to be authenticated. The user may provide the previously established password to the server along with information identifying the user (e.g. a username). In some implementations, the password may be provided over a secure link, such as an SSL link. In some implementations, the actual password may not be provided, but rather a hash of the password. Regardless of implementation, the user identifier and password is passed to the server. The server may then verify that the password is correct, thus satisfying the "something you know" authentication factor.

The server may then send a time stamp to the user device. For example, the time stamp could be the approximate time when the authentication request was received. The server may store this time for later use, as will be described below. The time stamp may also be accompanied by a request for the user device to provide user biometric data. The user may receive the request for biometric data and provide the biometric data through a biometric device (not shown). As mentioned above, the techniques described herein are not dependent on the particular type of biometric data that is collected.

The user device, using the authentication agent, may then prepare a response. The authentication agent may first retrieve the device identifier from the user device. The derived device identifier may then be determined using the same derivation process that was used when the authentication agent was generated. The two derived identifier may then be compared. If they do not match, that means that the authentication agent is not running on the same device for which the authentication agent was generated (e.g. the authentication agent may have been copied from one computer to a different computer). As such, the "something you have" factor cannot be satisfied, and the authentication may fail.

Assuming that the derived identifiers match, the biometric data and the time stamp may be encrypted using the authentication agent. The exact mechanism for encryption is relatively unimportant, but rather the characteristics of the encryption process may be such that any message encrypted using the encryption agent may only be decrypted by an entity that knows the number and locations of the tags used in the generation of the authentication agent. As such, because the server generated the encryption agent for the user, the server is able to decrypt anything encrypted with the particular encryption agent.

The user device may then send the encrypted biometric data and time stamp in a response to the server. The server may then decrypt the time stamp and the biometric data using the same user parameters (e.g. number and locations of tags within the authentication agent). If the message is successfully decrypted, then this ensures that the response was generated suing the authentication agent created for that user (because the tags and locations matched) on the same device for which the authentication agent was created (because the derived identifiers match). As such, it can be ensured that the authentication attempt is coming from the device associated with the user, satisfying the "something you have" factor.

The time stamp may then be compared with the current time to determine how much time has elapsed between when the time stamp was sent and when the encrypted response was received. If too much time has passed, it may be possible that the biometric data was not obtained at the same time as the authentication request. For example, if the data was recorded from a previous successful authentication request, and is now being replayed. If too much time has elapsed, the authentication may fail. Assuming that the elapsed time has not exceeded the threshold, the biometric data may be compared with the previously stored biometric data. If there is a match, the user has satisfied the "something you are" authentication factor. Thus, the user has now passed all three authentication factors and can be authenticated.

Figure 2:
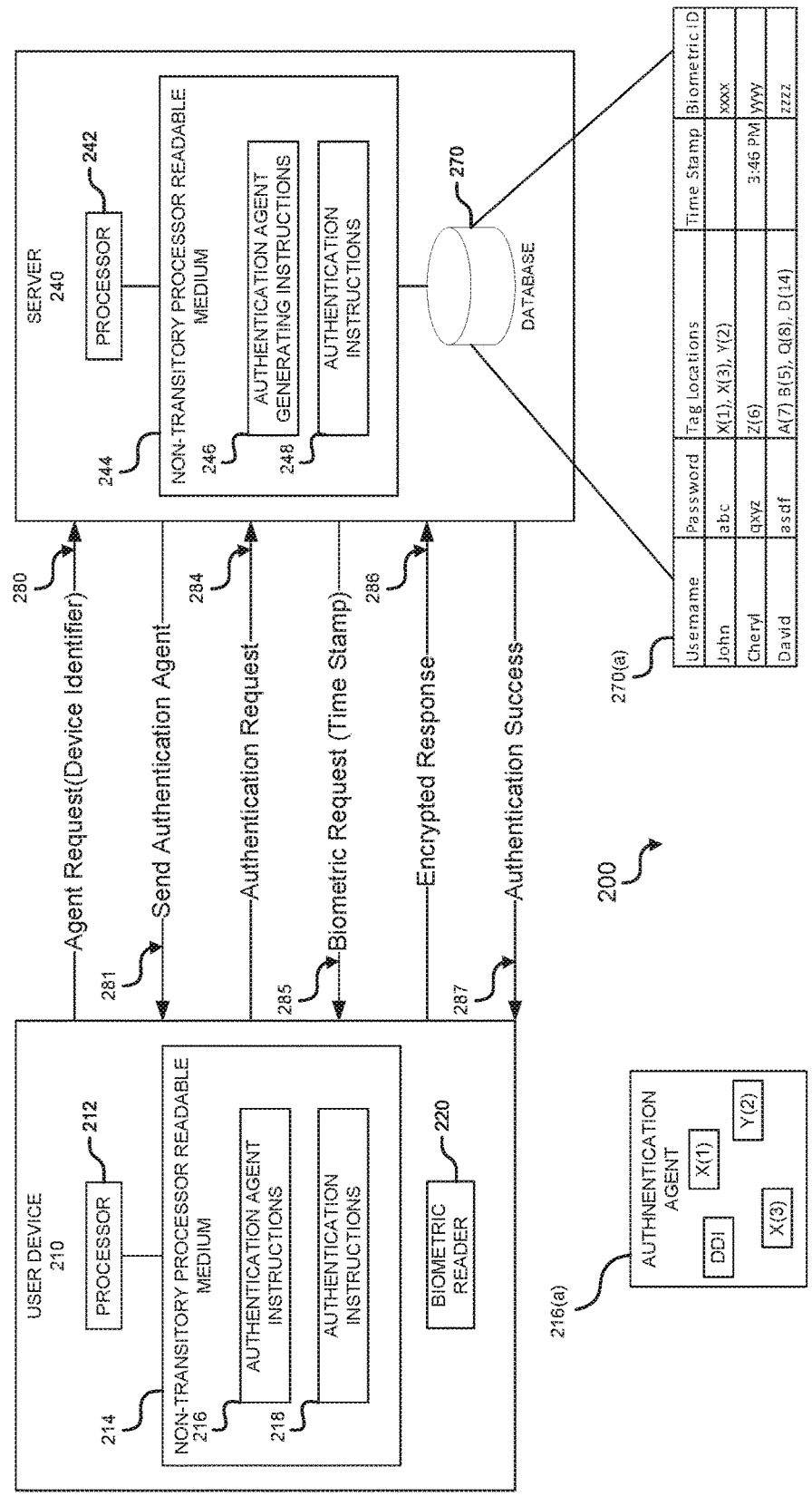
FIG. 2 is another example of a system that may utilize the device authentication agent described herein.

FIG. 2 is another example of a system that may utilize the device authentication agent described herein. System 200 contains many components that are similar to those in FIG. 1. For example, the user device 110, processor 112, medium 114, instructions 116 and 118 from FIG. 1 are substantially equivalent to elements 210, 212, 214, 216, and 218 of FIG. 2. Likewise, server 140, processor 142, medium 144, instructions 146 and 148, and database 170 are substantially equivalent to elements 240, 242, 244, 246, 248, and 270 of FIG. 2. The description of those elements will not be repeated here for the sake of ease of description. For ease of description, the network connecting the user device and server has been omitted, however it should be understood that the user device and server are able to communicate with each other.

System 200 depicts a biometric reader 220 as part of the user device. The biometric reader can be of any suitable for to obtain user biometric identification information. For example, the biometric reader may be a fingerprint reader, a retinal scanner, a DNA scanner, or any other type of biometric reader. Techniques described herein are not dependent on any particular type of biometric parameter.

System 200 also depicts some of the specific data that may be stored in database 270. For example, table 270(*a*) depicts an example of some of the data that may be stored in database 270. For example, the table shows three users, John, Cheryl, and David. The database may store a password for each of those users, as well as biometric identification information for each user. In addition, the table may show the user specific parameters that were used (e.g. the number and locations of the tags) when generating the authentication agent.

The techniques described herein may be better understood by way of an example. For purposes of this description, assume that initially, the system has no knowledge of the user with the user name John. Also assume that user device 210 belongs to and is being operated by the user named John. Initially, at step 280, the user John may request an authentication agent. The request may include a device identifier of the user device 210 (e.g. a serial number). In addition, the user may provide biometric information (e.g. a fingerprint) of the user John as well as a password for the user John to the server. As mentioned above, the particular mechanism by which this information is provided to the server (e.g. SSL, manual entry, etc.) is not important. The techniques described herein are independent of how the information is obtained by the server.

The server 240 may then store the information related to the user John in the database. This may include the username, the password, and the biometric identification information. The server may then select a random number of tags. As part of the process of generating the authentication agent, the server may insert the random number of tags into randomly selected locations within the authentication agent. The number and locations of those tags may be stored in the database. As shown in table 270(a), for user John, 3 tags were selected. The tags are labeled as X(1), X(3), and Y(2) which may represent the locations within the authentication agent where the tags are to be placed.

The server may then use the received device identifier and generate a derived device identifier (DDI). There is generally no need to store the DDI in the database, as verification of the DDI may be done by the user device, as will be explained below. Authentication agent 216(a) depicts the authentication agent created for user John. The authentication agent may then be sent 281 to the user device. It should be understood that the steps of generating the authentication agent may occur one time and may occur prior to any authentication attempt.

The user John may then wish to perform an authentication. Using the user device, the user John may send an authentication request 284, including his username and password to the server. The server may receive the request and retrieve user John's information from the database 270, based on the username. The server may then compare the received password to the password stored in the database. If they match, the server may determine that user John has passed the "something you know" authentication factor. It should be understood that the password need not be sent in clear text to the server. The password may be encrypted, or a hash of the password may be sent. What should be understood is that the server is able to verify that the user purporting to be user John knows the password associated with John.

The server may then send 285 a request for biometric data to the user device. The request may include a time stamp which may be the approximate time the request for biometric data is sent. The server may store this time stamp in the database 270. As shown, the time 3:46 PM is stored in table 270(a).

Upon receipt of the request for biometric data, the user device may first confirm that the authentication agent is executing on the device for which it was created. The authentication agent may retrieve the device identifier and compute the DDI. The computed DDI may then be compared to the DDI stored in the authentication agent 216(a). If there is a mismatch, the agent is not running on the device for which it was created. As such, the authentication attempt may fail at this point.

Assuming a match in the DDI, the user device may then obtain the biometric data from the user using the biometric reader 220. For example, the biometric data may be a fingerprint and the biometric reader may be a fingerprint reader. It should be understood that the techniques described herein are not dependent on any particular type of biometric identifier. The authentication agent may then encrypt the biometric data and the time stamp based on the random number of randomly placed tags within the authentication agent. As mentioned before, the specific form of the encryption is unimportant, so long as certain criteria are met. First, it should be possible for any entity that knows the parameters used to generate the authentication agent to decrypt a message encrypted by that authentication agent. Second, it should be substantially impossible to determine the number and placement of the random tags by analyzing the encrypted message.

The user device may then send the encrypted response 286 to the server. The server may first decrypt the response based on the random number and locations of the tags. As mentioned above, the server may have stored this information when the authentication agent was created, and is thus able to decrypt any message encrypted with the authentication agent generated for user John. If the decryption is successful, the server can confirm that the response was generated by the authentication agent that was created for the user John, because otherwise the decryption operation would have failed. Furthermore, the server is ensured that the authentication agent is running on the device for which it was created because the DDI comparison would have failed otherwise. As such, the server is able to confirm the "something you have" authentication factor.

The server may then compare the time stamp in the encrypted response with the current time stamp as well as the time stamp stored in the database. If the time stamp stored in the database does not match the decrypted time stamp, then the authentication request may fail. Likewise, if too much time has elapsed between when the time stamp was sent and the current time, the authentication may also fail. If the time stamp matches that which was sent, and too much time has not elapsed, the server can be ensured that this is not a replayed encrypted response message. Furthermore, because the timestamp is included when encrypting the biometric data, the server can be ensured that the biometric data was captured substantially contemporaneously with the authentication request. If the biometric data matches that stored in the database, the user has provided the "something you are" authentication factor. At that point, a response 287 indicating authentication success may be sent to the user.

Figure 3:
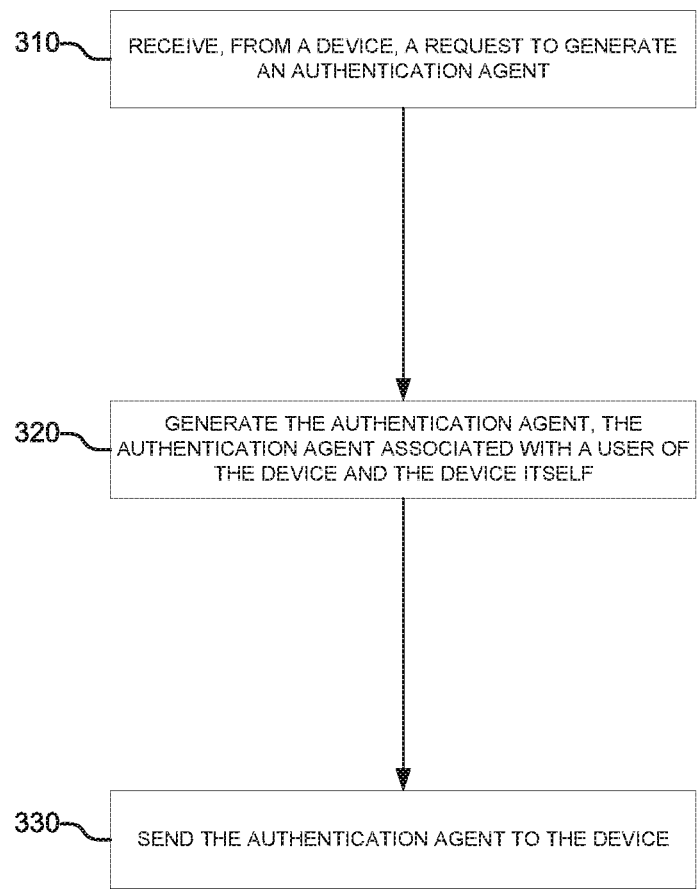
FIG. 3 is an example of a flow diagram for generating an authentication agent according to the techniques described herein.

FIG. 3 is an example of a flow diagram for generating an authentication agent according to the techniques described herein. The techniques described in FIG. 3 may be executed by the user device described above. In block 310, a request to generate an authentication agent may be received from a device. As explained above, an authentication agent may be used by the device to allow the user to be authenticated according to the techniques described herein.

In block 320, the authentication agent may be generated. The authentication agent may be associated with a user of the device and the device itself. In other words, the authentication agent is tied to both the user and the user's device. The authentication will not work on a device different from the one for which it was created. The authentication agent will also not work for a different user. As such, the authentication agent is created for a specific user using a specific device. In block 330, the authentication agent may be sent to the device.

Figure 4:
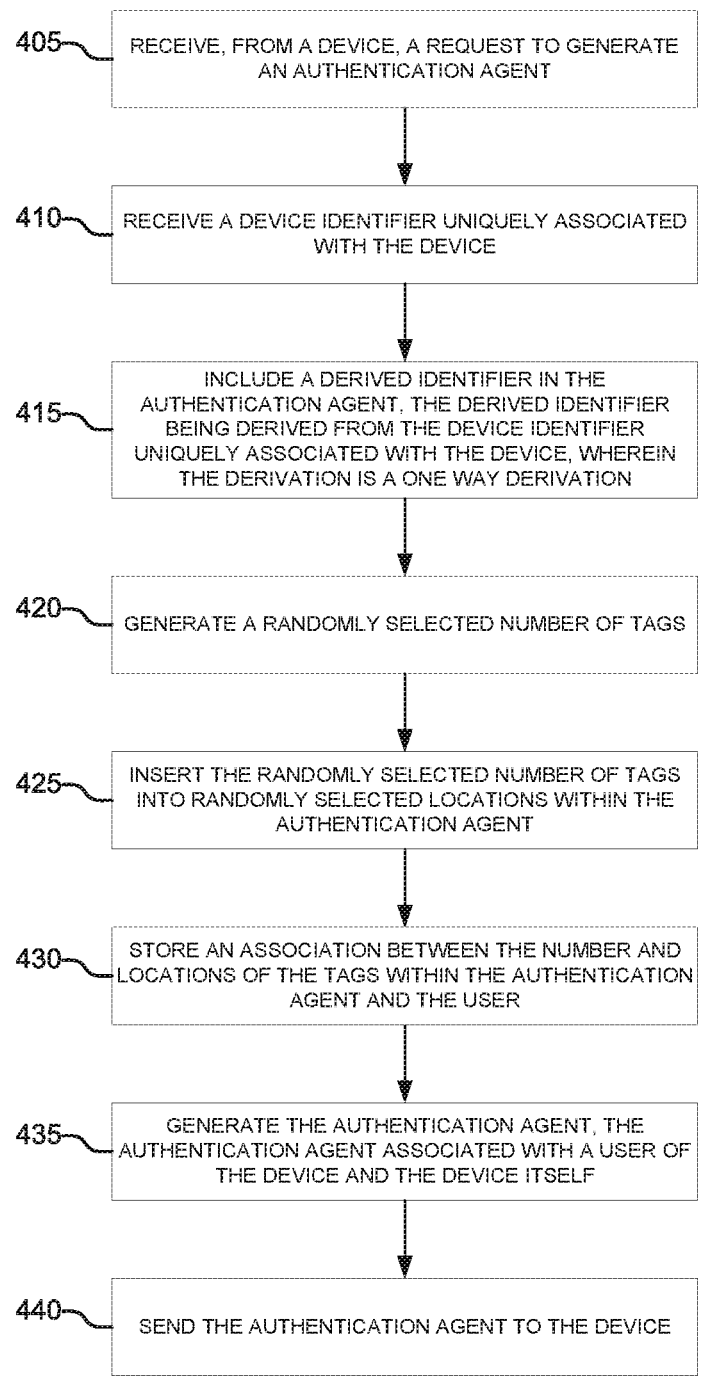
FIG. 4 is another example of a flow diagram for generating an authentication agent according to the techniques described herein.

FIG. 4 is another example of a flow diagram for generating an authentication agent according to the techniques described herein. The techniques described in FIG. 4 may be executed by the user device described above. In block 405, just as above in block 310, a request to generate an authentication agent may be received form a device. In block 410, a device identifier that is uniquely associated with the device may be received. For example, the device identifier may be a serial number of the device. As another example, the device identifier may be a media access control (MAC) address of the device. The techniques described herein are not dependent on the particular type of device identifier. Any device identifier that may uniquely identify the device may be suitable.

In block 415, a derived identifier may be included in the authentication agent. The derived identifier may be derived from the device identifier that is uniquely associated with the device. The derivation may be a one way derivation. In other words, a derived identifier may be generated from the unique device identifier. The derivation may be a one way derivation in that it is not possible to recover the unique device identifier from the derived identifier. For example, a derived identifier may be generated by running the device serial number through a hashing algorithm, such as Secure Hashing Algorithm (SHA)-1. The characteristics of SHA-1 ensure that given the derived identifier, it is not practically possible to recover the original serial number. Techniques described herein are not dependent on any particular type of derivation algorithm. Any derivation algorithm that ensures that the device identifier cannot be recovered from the derived device identifier would also be suitable.

In block 420, a randomly selected number of tags may be generated. In block 425, the randomly selected number of tags may be inserted into randomly selected locations within the authentication agent. In block 430, an association between the number and locations of the tags within the authentication agent and the user may be stored. In block 435, the authentication agent may be generated. The authentication agent may be associated with a user of the device and the device itself.

In other words, a number of tags are randomly selected for a user. Thus, the number of tags for any given user is not fixed. The probability that any two users have the same number of tags selected is then dependent on the total number of possible tags. For example, if there can be from 1 to 20 tags, the probability that two users have the same number of randomly selected tags is ½₀. Likewise, the tags may be inserted into random locations within the authentication agent. Therefore, even if two users do have the same number of randomly selected tags, the probability that the selected locations are the same for each user is reduced.

The end result may be that the authentication agent is, within a defined probability, unique for each user. Furthermore, when combined with the derived identifier that is also included within the authentication agent, the likelihood of two users having the same authentication agent generated is minimal. In block 440, the authentication agent may be sent to the device.

Figure 5:
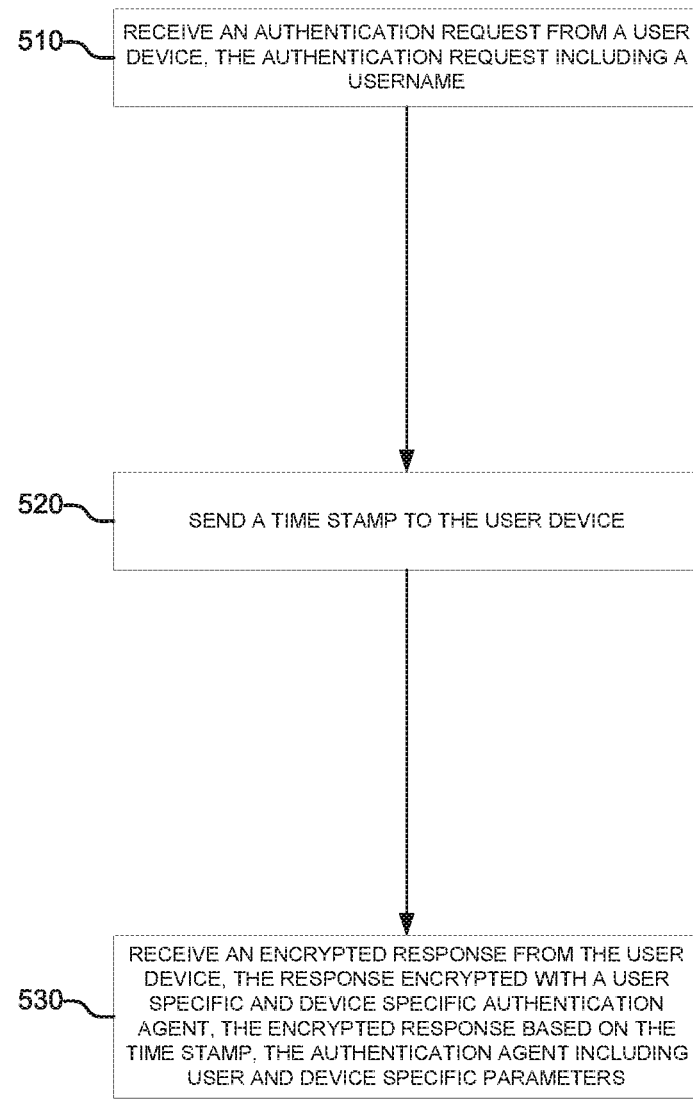
FIG. 5 is an example of a flow diagram for receiving a request to authenticate a user according to the techniques described herein.

FIG. 5 is an example of a flow diagram for receiving a request to authenticate a user according to the techniques described herein. The techniques described in FIG. 5 may be executed by the server described above. In block 510, an authentication request may be received for a user device. The authentication request may include a username. As mentioned above, the username may be used to lookup parameters, such as password and authentication agent details, for the specific user attempting authentication.

In block 520, a time stamp may be sent to the user device. The time stamp may indicate the current time of day. The time stamp may be utilized later to determine the time elapsed between sending the time stamp and when a response is received, as will be described below.

In block 530, an encrypted response may be received form the user device. The response may be encrypted with a user specific and device specific authentication agent. The encrypted response may be based on the time stamp. The authentication agent may include user and device specific parameters. In other words, after the user device receives the time stamp, a response may be sent. The response may be encrypted by an authentication agent that is specific to the user and the particular device. The encrypted response may include the time stamp previously sent to the user device, such that the elapsed time between sending the time stamp and the receipt of the encrypted response may be determined.

Figure 6:
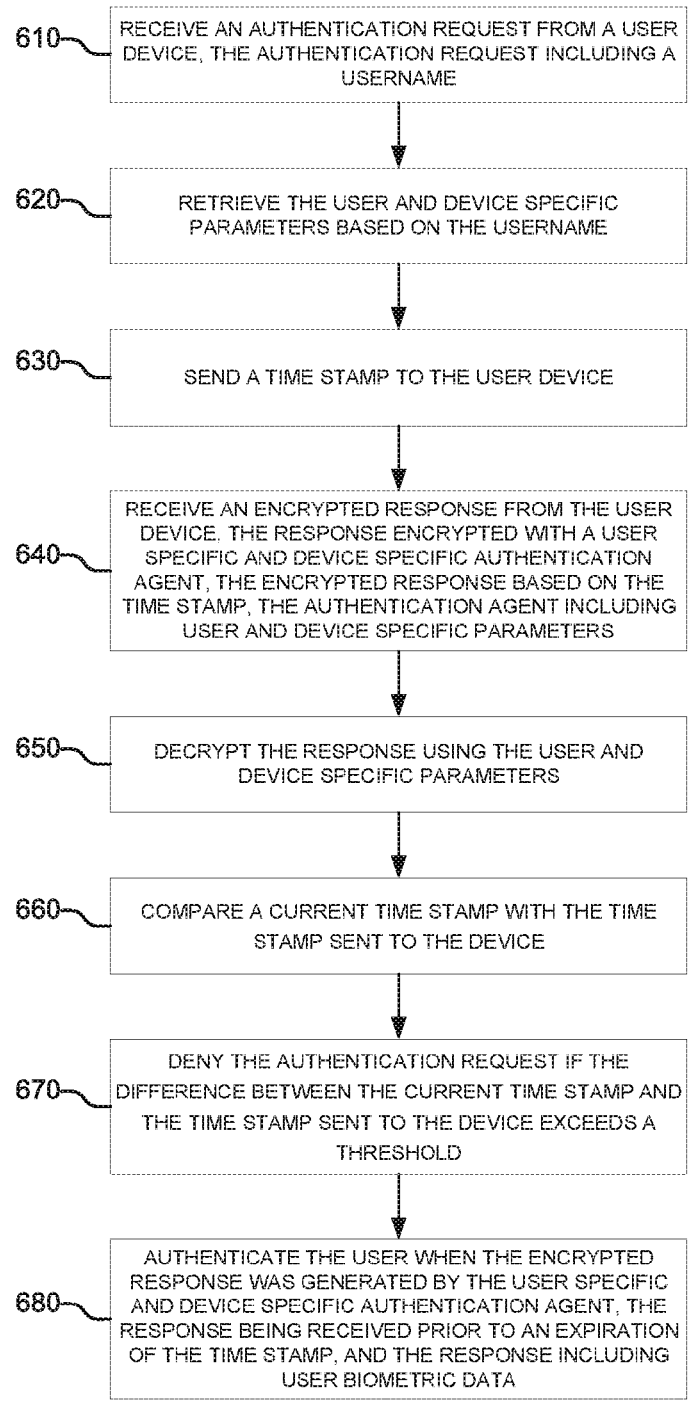
FIG. 6 is another example of a flow diagram for receiving a request to authenticate a user according to the techniques described herein.

FIG. 6 is another example of a flow diagram for receiving a request to authenticate a user according to the techniques described herein. The techniques described in FIG. 6 may be executed by the server described above. In block 610, just as above in block 510, an authentication request may be received form a user device. The authentication request may include a username. In block 620, user and device specific parameters may be retrieved based on the user name. As mentioned above, the server may store the parameters used to create the authentication agent for a specific combination of user and user device. Given the username, the server may retrieve the parameters used to create the authentication agent.

In block 630, just as above in block 520, a time stamp may be sent to the user device. In block 640, just as above in block 530, an encrypted response may be received from the user device. The response may have been encrypted with a user specific and device specific authentication agent. The encrypted response may be based on the timestamp. The authentication agent may include the user and device specific parameters.

In block 650, the response may be decrypted using the user and device specific parameters. In other words, the server knows how the authentication agent was created, and thus knows how the authentication agent would have encrypted the response. Thus, the server may have the information needed to decrypt the response. As part of the decryption, the time stamp may be retrieved from the decrypted response. In block 660, the current time stamp (e.g. the current time) can be compared to the time stamp sent to the user device in block 630.

In block 670, the authentication request may be denied if the difference between the current time stamp and the time stamp sent to the device exceeds a threshold. For example, the threshold may be one second, one minute, one hour, or any other suitable threshold. The threshold may ensure that the encrypted response includes data that was collected substantially contemporaneously with the authentication request. For example, if a previous encrypted response from a previous successful authentication attempt were intercepted by a malevolent actor, that actor may attempt to "replay" the response to fool the server. However, the timestamp from the previous response would indicate the time at which the previous authentication request was initially sent. Thus, the time stamp may indicate that the response was "old" and was likely not generated in response to the current authentication request.

In block 680, the user may be authenticated when the encrypted response was generated by the user specific and device specific authentication agent, the response was received prior to an expiration of the time stamp, and the response includes user biometric data. In other words, proper decryption of the response means that the response was encrypted by the authentication agent that was created for the specific user and the specific device, thus ensuring that the user is in possession of the authentication agent and is using the device for which the authentication agent was created. The time stamp having been within the threshold indicates that the response was generated substantially contemporaneously with the authentication request. Finally, by including biometric data that actually belongs to the user, it can be ensure that the user was present at the time the encrypted response was generated.

Figure 7:
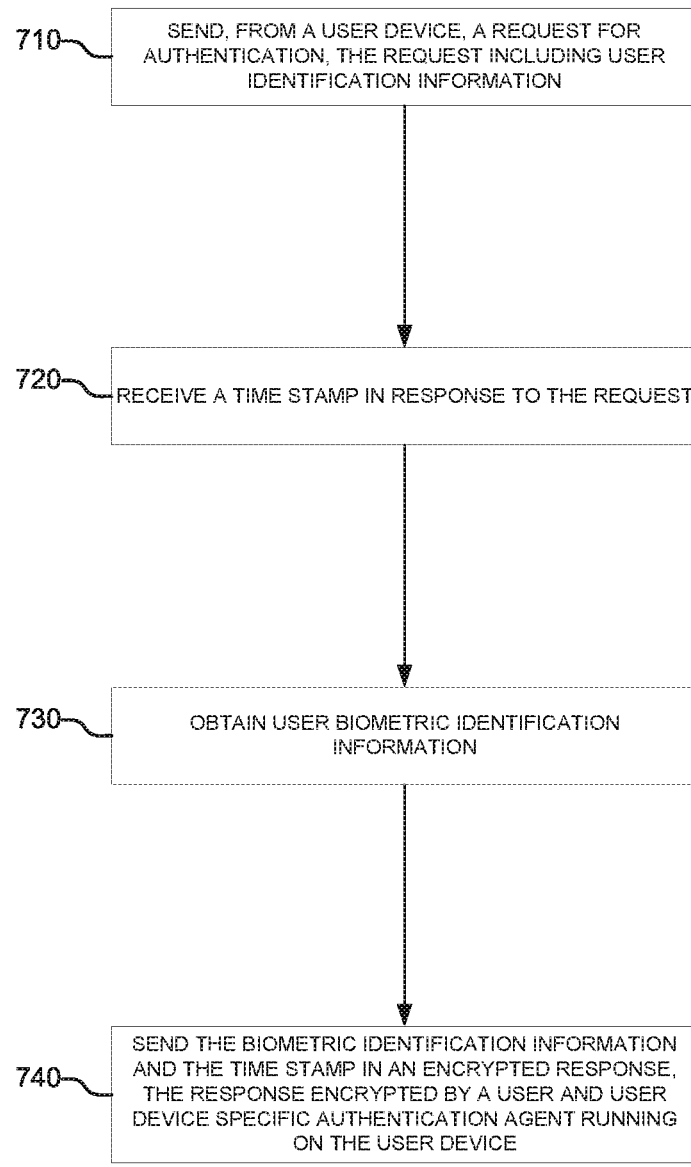
FIG. 7 is an example of a flow diagram for a user device requesting authentication according to the techniques described herein.

FIG. 7 is an example of a flow diagram for a user device requesting authentication according to the techniques described herein. The techniques described in FIG. 7 may be executed by the user device described above. In block 710, a request for authentication may be sent from a user device. The request may include user identification information. For example, the request may include a username. The request may also include a password. The password may be encrypted or a hash of the password may be sent. What should be understood is that the request for authentication includes information that allows the user to be identified.

In block 720, a time stamp may be received in response to the request. As explained above, the time stamp may be used later to ensure that a previous authentication response is not replayed. The time stamp may also be used to ensure that the biometric data is captured at the time of the authentication request instead of having been previously captured, as is described in further detail below. In block 730, user biometric data may be obtained. For example, biometric data may include fingerprints, retinal scans, DNA information, or any other type of data that is uniquely associated with the user's physical being. The particular form of biometric data is unimportant, and the techniques described herein are not dependent on any particular type of biometric data.

In block 740, the biometric identification information and the time stamp may be sent in an encrypted response. The response may be encrypted by a user and user device specific authentication agent running on the user device. In other words, the biometric identification data and the time stamp are encrypted using an authentication agent that is tied to the specific user and the specific device. A malevolent user would not be able to pretend to be the authorized user, because a malevolent user would not know the proper password (e.g. something you know). Furthermore, because the authentication agent is tied to the specific user device through the derived identifier, copying the authentication agent to a different device renders the authentication agent useless (e.g. the device is something you have). Finally, by including the time stamp data in the encrypted response, it can be ensured that the biometric data (e.g. something you are) was captured at the same time as the authentication request, and is not simply a replay of a previous authentication session.

Figure 8:
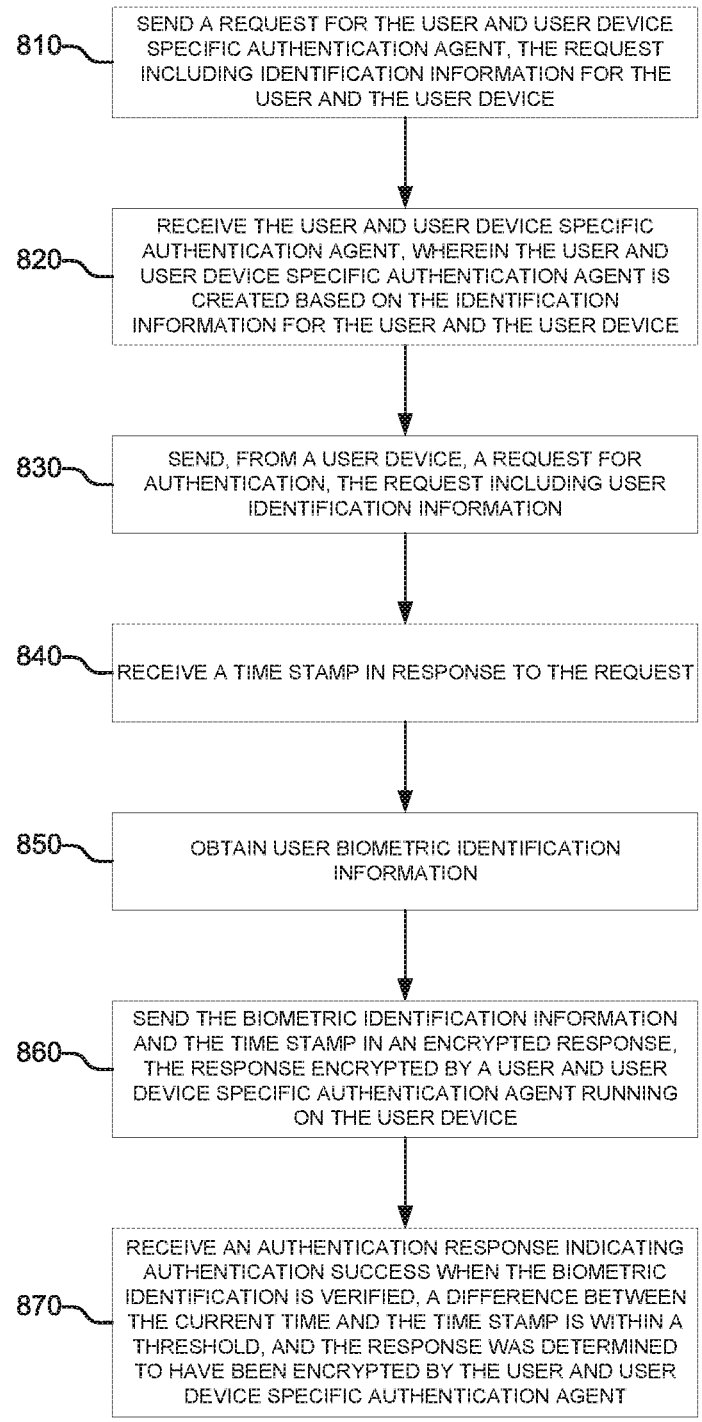
FIG. 8 is an example of a flow diagram for a user device requesting authentication according to the techniques described herein.

FIG. 8 is an example of a flow diagram for a user device requesting authentication according to the techniques described herein. The techniques described in FIG. 8 may be executed by the user device described above. In block 810, a request for the user and user device specific authentication agent may be sent. The request may include identification for the user and the user device. For example, the user identification information may include a username and a password or a hash of a user password. The user device identification information may include identification information such as a serial number or a MAC address. The identification information may be used by the server to generate a user and user device specific authentication agent, as has been described above.

In block 820, the user and user device specific authentication agent may be received. The user and user device specific authentication agent may have been created based on the identification information for the user and user device. In other words, the authentication agent that was specifically created for the user using a particular device is sent to that device. The authentication agent is thus only usable by that specific user using that specific device. Any attempts by a different user to use the authentication agent or attempts to use the authentication agent on a different device may fail.

In block 830, just as above in block 710, a request for authentication may be sent from the user device. The request may include user identification information. In block 840, just as above in block 720, a time stamp may be received. In block 850, as above in block 730, user biometric information may be obtained. In block 860, as above in block 740, the biometric identification information and the time stamp may be sent in an encrypted response. The response may be encrypted by the user and user device specific authentication agent running on the user device. The authentication agent may have been previously received in block 820.

In block 870, an authentication response may be received. The authentication response may indicate authentication success when the biometric identification is verified, a difference between the current time and the time stamp is within a threshold, and the response was determined to have been encrypted by the user and user device specific authentication agent. In other words, authentication may be successful if it is determined that the specific user, using the specific device for which the authentication agent was created provided biometric data that was collected at substantially the same time that the authentication request was made and that biometric data matches the biometric data associated with the user.

We claim:
1. A method comprising:
    receiving, by a server, a request from a user computing device to generate an authentication agent, the request including a device identifier uniquely associated with the user computing device;
    generating, by the server, the authentication agent, the authentication agent associated with a user of the user computing device and the user computing device itself and including a derived identifier, the derived identifier being derived from the device identifier;
    sending, from the server, the authentication agent to the user computing device;
    receiving, by the server, an encrypted response from the user computing device, the encrypted response based in part on the derived identifier of the authentication agent matching a derived identifier derived in the user computing device from the device identifier; and
    inserting, by the server, user identification information within the authentication agent, the inserting including:
    generating, by the server, a randomly selected number of tags;
    inserting, by the server, the randomly selected number of tags into randomly selected locations within the authentication agent; and
    storing, by the server, an association between the number and locations of the tags within the authentication agent and the user;

wherein the derivation of each of the derived identifier in the authentication unit and the derived identifier in the user computing device is a one way derivation.

2. The method of claim 1 wherein each device identifier is a serial number of the respective user computing device, and each derived identifier is a checksum of the respective serial number.

3. A non-transitory processor readable medium containing thereon a set of instructions which when executed by a processor cause the processor to:
receive, by a server, a request from a user computing device to generate an authentication agent, the request including a device identifier uniquely associated with the user computing device;
generate, by the server, an authentication agent, the authentication agent associated with a user of the user computing device and the user computing device itself and including a derived identifier, the derived identifier being derived from the device identifier;
receive, by the server, an authentication request from the user computing device, the authentication request including a username;
send, from the server, a time stamp to the user computing device;
receive, by the server, an encrypted response from the user computing device, the response encrypted with the authentication agent, the encrypted response based on the time stamp, the authentication agent including user and user computing device specific parameters, and the encrypted response further based on the derived identifier of the authentication agent matching a derived identifier derived in the user computing device from the device identifier; and
insert, by the server, user identification information within the authentication agent, the inserting including:
generating, by the server, a randomly selected number of tags;
inserting, by the server, the randomly selected number of tags into randomly selected locations within the authentication agent; and
storing, by the server, an association between the number and locations of the tags within the authentication agent and the user;
wherein the derivation of each of the derived identifier in the authentication unit and the derived identifier in the user computing device is a one way derivation.

4. The medium of claim 3 further comprising instructions to:
retrieve, by the server, the user and user computing device specific parameters based on the username; and
decrypt, by the server, the response using the user and user computing device specific parameters.

5. The medium of claim 3 further comprising instructions to:
compare, by the server, a current time stamp with the time stamp sent to the user computing device; and
deny, by the server, the authentication request if the difference between the current time stamp and the time stamp sent to the user computing device exceeds a threshold.

6. The medium of claim 3 wherein the encrypted response includes encrypted biometric data of the user.

7. The medium of claim 3 further comprising instructions to:
authenticate, by the server, the user when the encrypted response was generated by the authentication agent, the response being received prior to an expiration of the time stamp, and the response including user biometric data.

* * * * *